US006944958B1

(12) United States Patent
King

(10) Patent No.: US 6,944,958 B1

(45) Date of Patent: Sep. 20, 2005

(54) CHAIN SAW CHAIN TENSIONING AND BRAKING SYSTEM

(76) Inventor: William C. King, 15185 Buchanan Trail W., Mercerburg, PA (US) 17236

(*) Notice: Subject to any disclaimer, the term of this patent is extended or adjusted under 35 U.S.C. 154(b) by 121 days.

(21) Appl. No.: 10/047,402

(22) Filed: Jan. 15, 2002

Related U.S. Application Data

(63) Continuation-in-part of application No. 09/853,942, filed on May 11, 2001, now Pat. No. 6,769,187.

(60) Provisional application No. 60/245,939, filed on Nov. 6, 2000, provisional application No. 60/290,226, filed on May 11, 2001.

(51) Int. Cl.[7] ........................ B23D 57/02; B27B 17/02; B27B 17/14

(52) U.S. Cl. ............................ 30/387; 30/381; 30/383; 30/386; 83/814; 188/65.1

(58) Field of Search .......................... 30/381, 382, 383, 30/384, 385, 386, 387; 83/820, 814; 188/65.1

(56) References Cited

U.S. PATENT DOCUMENTS

| | | | | |
|---|---|---|---|---|
| 1,260,701 | A * | 3/1918 | Olson | 30/384 |
| 1,260,702 | A * | 3/1918 | Olson | 30/384 |
| 2,532,981 | A * | 12/1950 | Wolfe | 30/385 |
| 3,279,508 | A * | 10/1966 | Ehlen et al. | 30/385 |
| 3,390,710 | A * | 7/1968 | Cookson et al. | 30/381 |
| 3,793,727 | A | 2/1974 | Moore | 30/383 |
| 4,361,960 | A * | 12/1982 | Halverson | 30/385 |
| 4,373,265 | A * | 2/1983 | van Halderen | 30/383 |
| 4,382,334 | A | 5/1983 | Reynolds | 30/386 |
| 4,534,112 | A * | 8/1985 | Bass | 30/383 |
| 4,594,780 | A | 6/1986 | Schliemann et al. | 30/382 |
| 4,611,401 | A | 9/1986 | Piller | 30/387 |
| 4,677,746 | A * | 7/1987 | Raiski | 30/381 X |
| 4,924,577 | A | 5/1990 | Leini | 30/387 |
| 5,101,567 | A | 4/1992 | Cool | 30/382 |
| 5,174,029 | A | 12/1992 | Talberg | 30/386 |
| 5,233,750 | A | 8/1993 | Wolf et al. | 30/382 |
| 5,249,362 | A | 10/1993 | Harding | 30/383 |
| 5,445,365 | A | 8/1995 | Forderer | 267/137 |
| 5,491,899 | A | 2/1996 | Schliemann et al. | 30/386 |
| 5,522,143 | A | 6/1996 | Schliemann et al. | 30/386 |
| 5,528,835 | A | 6/1996 | Ra | 30/386 |
| 6,061,915 | A * | 5/2000 | Seigneur et al. | 30/386 |
| 6,148,524 | A * | 11/2000 | Nitschmann | 30/383 |
| 6,769,187 | B2 * | 8/2004 | King | 30/383 |

* cited by examiner

*Primary Examiner*—Clark F. Dexter
(74) *Attorney, Agent, or Firm*—James D. Welch

(57) ABSTRACT

A chain saw which includes chain tensioning and braking systems. Tensioning and braking are caused by the presence and control of longitudinal and lateral slits in an elongated support which provides a continuous chain channel guide in its outer circumference.

20 Claims, 6 Drawing Sheets

CHAIN SAW CHAIN TENSIONING AND BRAKING SYSTEM

This Application is claims the benefit of Provisional Patent Application Ser. No. 60/245,939, filed Nov. 6, 2000, 60/290,226 filed May 11, 2001; and is a CIP of Utility patent application Ser. No. 09/853,942 filed May 11, 2001 now U.S. Pat. No. 6,769,187.

TECHNICAL AREA

The present invention relates to chain saws, and more particularly to a system and method for continuously adjustable tensioning of, and for applying braking to, a cutter providing chain thereof.

BACKGROUND

Chain saws are well know means for cutting wood and the like and used properly can greatly reduce work, however, if not used carefully user injury can occur. As a result, safety features are desirable. Critical to optimum operation is the capability of a chain saw system to maintain proper tension on a cutter blade containing chain, and critical to safety is the ability to stop a cutter blade containing chain from moving when the motor is running but the chain saw is not being applied to useful work. That is, efficient chain saw chain tensioning and braking systems provide utility. Further, it must be understood that chain saws are very low torque, but high speed systems that derive cutting ability by generating high chain speed. That is, at a given torque, the cutting power is directly proportional to chain speed. It is therefore common for a chain saw to stall in use due to minor chain pinching, taking too big a "bite" of, or causing too much down force on, an item being cut. Further, chain pinching and the like is more likely when chain tension is not proper, and it is noted, too high a tension in a chain saw chain can cause a chain motion stopping, (ie. braking), result.

It is in light of the foregoing it is generally disclosed at this point that the present invention is a new tensioning and braking system and method for application to chain saw chains.

With an eye to the present invention a Search of Patents was performed.

U.S. Pat. No. 5,528,835 to Ra is identified because it describes a chains saw chain tensioning system.

U.S. Pat. No. 5,174,029 to Talberg is identified as it describes a chain saw chain tensioning system.

U.S. Pat. Nos. 5,491,899, 5,522,143 and 4,594,780 to Schliemann et al. are identifed as describing chain saw chain motion braking systems.

U.S. Pat. No. 5,233,750 to Wolf et al. is identified as describing a chain saw chain braking system.

U.S. Pat. No. 5,101,567 to Cool was identified and describes a braking mechanism (40) and brake lever (42).

U.S. Pat. No. 3,793,727 describes a system in which two handles must be engaged against the chain saw frame to allow the chain to move. If either is released the chains stops.

U.S. Pat. Nos. 4,924,577 and 4,611,401 are included to show that the Chain Guide can be split in a way that allows extending the length thereof by adding sections.

U.S. Pat. No. 5,445,365 to Forderer shows application of a "dumbbell" element, but its applied as a connection element, rather than a means to line-up ends of a Slit Chain Saw Chain Guide.

Other Patents identified and which are of general interest are:

U.S. Pat. No. 5,249,362 to Harding; and

U.S. Pat. No. 4,382,334 to Reynolds.

Even in view of the prior art, need remains for additional systems and methods to enable proper tensioning and motion braking of chain saw chains.

DISCLOSURE OF THE INVENTION

The present invention system is primarily a continuously adjustable, (within limits of operation), means for tensioning Chain Saw Chains, said system being adaptable to application in braking the motion of chain saw chains. It is first noted that Chain Saw Blade containing Chains move in a Chain Saw Blade Guide Means in the periphery of an Elongated Support Means which projects from a Motor Housing of a Chain Saw System, and said Chain Saw Chains must have properly tensioned contact with the Guide Means to facilitate functional motion thereof. Various approaches to adjusting tension have been developed, but none are known that provide continuous adjustment over an allowed range. The present invention enables continuously adjustable tensioning by splitting the Elongated Support Means Longitudinally, as viewed in side elevation, such that upper and lower portions above and below a Longitudinal Slit can be separated from one another. Such separation in turn causes a "stretching" of the Chain Saw Chain. The present invention comprises means for fixing in place the upper and lower portions above and below the Longitudinal Slit with respect to one another once they are properly separated apart, hence allows setting of the tensioning of the chain saw chain.

A variation of the system allows for applying Motion Braking to a Chain saw Chain by separating the upper and lower portions of the elongated support to the point that resistance to the chain saw chain motion in said guide means is developed which is sufficient to stop the chain saw chain motion. That is, the present invention can be applied to develop resistance to Chain Saw chain motion by splitting the Elongated Support Means laterally, as viewed in side elevation, by causing upper and lower portions above and below the Longitudinal Slit to be separated from one another. Such separation in turn causes a "stretching" of the Chain Saw Blade, and when this effect is sufficient, it leads to stopping of the motion of the Chain Saw Blade through the Chain Saw Blade Guide Means in the periphery of an Elongated Support Means.

The present invention is then a chain saw comprising a motor inside a housing, a cutter providing chain saw chain comprised of links which include chain link mating elements, and an elongated support extending outward from inside said housing, said motor and chain saw chain being functionally interconnected inside said motor housing such that operation of said motor applies motion producing force to said chain saw chain. In the outer surface of said elongated support there is present a continuous chain channel guide into which said chain link mating elements slideably insert, such that during normal operation said chain link mating elements slide essentially freely through said continuous chain channel guide when forced to do so by operation of said motor, said elongated support being slit in a longitudinal direction as viewed in side elevation, such that the upper and lower portions above and below the Longitudinal Slit can be separated from one another, said Longitudinal Slit enabling separation of the upper and lower portions of said elongated support, thereby the causing of a "stretching" of the Chain Saw Chain, such that when said stretching is appropriate, the chain saw chain is properly tensioned to facilitate motion of said Chain Saw blade.

Said chain saw can provide that said elongated support is caused to be in an offset normally open position, from one side of said Longitudinal Slit to the other, unless a user causes it to be closed by operation of an a control means. Alternatively, said elongated support can be caused to be in a normally closed position, from one side of said Longitudinal Slit to the other, unless a user causes it to be separated by operation of an a control means. Further, the control means can be external to the Longitudinal Slit, or internal to the Longitudinal Slit.

An alternative recitation of a present invention system provides for a chain saw comprising a motor inside a housing, a cutter providing chain saw chain comprised of links which include chain link mating elements, and an elongated support extending outward from inside said housing, said motor and chain saw chain being functionally interconnected inside said housing such that operation of said motor applies motion producing force to said chain saw chain. In the outer surface of said elongated support there is present a continuous chain channel guide into which said chain link mating elements slideably insert, such that during normal operation said chain link mating elements slide essentially freely through said continuous chain channel guide when forced-to do so by operation of said motor. The continuous chain channel elongated support has a longitudinally oriented slit therein as viewed in side elevation, such that the upper and lower portions above and below the Longitudinal Slit can be separated from one another, said Longitudinal Slit enabling separation of the upper and lower portions of said elongated support, thereby the causing of a "stretching" of the Chain Saw Blade, such that when said stretching is sufficient, the chain saw chain has braking applied thereto, and is prevented from moving.

A method of operating a chain including causing motion of a chain saw chain and the stopping thereof, comprising the steps of:

a. providing a chain saw as described above;
b. causing said upper and lower portions of said elongated support to be appropriately separated from one another, such that slideability of said chain saw blade in said continuous chain channel guide is optimized, or so that its motion is prevented.

Said method can, in place of, or in addition to step b. include a step of:

c. causing adjusting the distance between the upper and lower portions above and below the Longitudinal Slit to brake the chain saw chain motion.

Continuing, for additional insight, it is again noted that it was related in co-pending patent application Ser. No. 09/853,942, that chain saws are very low torque, but high speed systems that derive cutting ability by generating high chain speed. That is, at a given torque, the cutting power is directly proportional to chain speed. It is therefore common for a chain saw to stall in use due to minor chain pinching, taking too big a "bite" of, or causing too much down force on, an item being cut. Further, chain pinching and the like is more likely when chain tension is not proper, and it is noted, too high a tension in a chain saw chain can cause a chain motion stopping, (ie. braking), result. It is such insight which initially led to the invention disclosed in co-pending application Ser. No. 09/853,942, which invention involves cutting a Lateral Slit into the Continuous Chain Channel Guide Upper or Lower surface, (typically the Upper surface near an oil entry port), so that the centrally located Channel region on one side of the resulting Lateral Slit can be, when desired, dislocated with respect to the centrally located Channel region on the other side of said Lateral Slit.

The purpose is that so, in use, when it is desired to stop the Chain Saw Chain from moving, causing the identified central Channel dislocation causes spread of adjacent Chain Saw Chain Links, elements of which adjacent Links then collide with edges of a dislocated central Channel region. This, in combination with other frictional interaction caused between the chain and offset channel regions, one side of said Lateral Slit to the other, provides effective "Braking", thereby causing the chain saw chain to stop.

The preferred embodiments of the previously disclosed chain saw chain braking system provided for the natural positioning of the centrally located Channel region in one resulting side of the cut Upper or Lower surface of the Elongated Support to be dislocated, (ie. not aligned), with respect to the centrally located Channel region in the other side, such that a User must apply central Channel region aligning force to position the centrally located Channel regions on both sides of the Lateral Slit to be aligned, thereby allowing the Blade Containing Links in the Chain Saw Chain to slideably travel in an elongated "circle" around said Upper and Lower surfaces of said Elongated Support.

A preferred embodiment of the previously taught chain saw chain motion braking system provides for a Dumbbell shaped element to effect the alignment of centrally located Channel regions by a User applied force which causes said Dumbbell element to move from being positioned on one side of the Lateral Slit to a position where it straddles the Lateral Slit. One embodiment provides that the Elongated Support be cut in two places, thereby providing a segment thereof which can be positioned such that the centrally located Channel therein is caused to be misaligned with centrally located Channel regions on either side of the two laterally oriented slits.

More precisely, the preferred embodiment of the previously disclosed invention is a chain saw comprising a motor inside a housing, a blade or cutter providing chain saw chain comprised of links which include chain link mating elements, and an elongated support extending outward from inside said housing, said motor and chain saw chain being functionally interconnected such that operation of said motor applies motion producing force to said chain saw chain. While not of Patentable importance, it is noted that the motor and chain saw chain typically are functionally interconnected inside said housing by a sprocket means which is affixed to the motor and engages the chain. Continuing, the outer perimeter surface of said elongated support has present an essentially centrally positioned continuous chain channel guide into which said chain link mating elements slideably insert. As with any conventional chain saw, during normal operation wherein the chain saw is used to cut such as wood etc., said chain link mating elements slide essentially freely through said continuous chain channel guide when forced to do so by operation of said motor. A distinguishing attribute of the preferred embodiment of the previously disclosed invention, however, is that in a present invention chain saw the continuous chain channel guide has at least one Lateral Slit present therein which allows effecting an offset of said continuous chain channel guide from one side thereof to the other, said offset, when caused to be present by an operator, serves to impede the free slideability of chain link mating elements across said Lateral Slit, and in combination with other caused friction based braking effects, prevents in the first place, or stops a chain saw chain's motion.

Preferred practice is to have the continuous chain channel guide be in an offset position, from one side of a Lateral Slit to the other, unless a user purposely, by definite positive action, causes it to be aligned by the operation of an a continuous chain channel guide alignment means, thereby providing a chain saw which impedes the slideability of chain link mating elements across said Lateral Slit until desired, and specifically effected by a user.

Further, the preferred continuous chain channel guide alignment means is a dumbbell shaped element slideably mounted in the elongated support, such that in use said dumbbell shaped element causes alignment of the continuous chain channel guide means from one side of the Lateral Slit to the other, when caused to be located so as to span said Lateral Slit.

In a modified embodiment the present invention provides that there be a second Lateral Slit said continuous chain channel guide which allows effecting an offset of said continuous chain channel guide from one side of said second Lateral Slit to the other.

Just as for the first Lateral Slit, preferred practice is to require that said continuous chain channel guide be in an offset position, from one side of said second Lateral Slit to the other, unless a user causes it to be aligned by operation of continuous chain channel guide alignment means, thereby providing a chain saw which impedes the slideability of chain link mating elements across said lateral slit until desired by a user. While an alignment means which applies to a first Lateral slit might be sufficient to align channel regions on either side of two Lateral Slits, just as for the first Lateral Slit, when present, the preferred continuous chain channel guide alignment means is a second dumbbell shaped element slideably mounted in the elongated support, such that in use said second dumbbell shaped element causes alignment of the continuous chain channel guide means from one side of the slit to the other, when caused to be located at and span said Lateral slit.

Another modified embodiment of the present invention provides that it is a chain saw comprising a motor inside a housing, a blade or cutter providing chain saw chain comprised of links which include chain link mating elements, and an elongated support extending outward from inside said housing. Again, said motor and chain saw chain are functionally interconnected inside said housing such that operation of said motor applies motion producing force to said chain saw chain. And as before, in the outer surface of said elongated support there being present a continuous chain channel guide into which said chain link mating elements slideably insert, such that during normal operation said chain link mating elements slide essentially freely through said continuous chain channel guide when forced to do so by operation of said motor. Said modified embodiment, however, provides that said continuous chain channel guide has means present therein which allows effecting an impeded chain channel guide, said means which allows effecting an impeded chain channel guide, serving to, when operated, impede the slideability of chain saw chain therethrough. As before, said means which allows effecting an impeded chain channel guide can comprise at least one slit laterally thereacross, but in the modified embodiment comprises any means which allows effecting an impeded chain channel guide, such as at least one collapsible wall region comprised of, for instance, laminations which move when pressure is applied thereto, or perhaps at least one insertional element which is entered thereinto through a means for entering an insertional element, (which means can comprise a separate portion of said wall), or any functionally equivalent means which enables applying friction to a chain saw chain to slow and stop its motion.

It is to be understood that a lateral slit can be caused to offset from top to bottom, as viewed in side elevation instead or, or in addition to from side to side as viewed from the top.

The present invention includes chain saw systems with both the described braking related Lateral Slit(s), and the chain saw chain tensioning/braking related Longitudinal Slit in the elongated support.

The present invention will be better understood by reference to the Detailed Description, in conjunction with the Drawings.

SUMMARY OF THE INVENTION

It is therefore a primary objective and/or purpose of the present invention to provide a new continuously adjustable chain saw chain tensioning/braking system for application in chain saw.

It is another objective and/or purpose of the present invention to teach the entering of a longitudinally oriented slit into an elongated support in a chain saw, said longitudinally oriented slit being:

- in an offset normally open position, from one side of said longitudinal slit to the other, unless a user causes it to be closed by operation of an a control means; or
- in a normally closed position, from one side of said longitudinal slit to the other, unless a user causes it to be separated by operation of an a control means.

It is yet another objective and/or purpose of the present invention to teach:

- control means which is external to the longitudinal slit; or
- control means which is internal to the longitudinal slit;

for application in continuously controlling the separation of the longitudinal slit, one side thereof to the other.

It is another objective and/or purpose of the present invention to teach the entering of a laterally oriented slit into a chain saw elongated support, in perimeter surfaces of which is located a continuous chain channel guide into which chain link mating elements are slideably inserted.

It is yet another objective and/or purpose of the present invention to teach that a continuous chain channel guide on one side of a laterally oriented slit should be offset from that on the opposite side thereof, and/or from top to bottom, when chain braking is to be effected.

It is still yet another objective and/or purpose of the present invention to teach the entering of any means which allows effecting an impeded chain channel guide, for use in effecting braking to a chain saw chain which is slideably mounted in said continuous chain channel guide into which chain link mating elements are slideably inserted.

Other objectives and/or purposes of the present invention will be disclosed by a reading of the Specification and claims.

DETAILED DESCRIPTION

The approach to Disclosure of the invention in this Section is to first focus on the primary aspect of the present invention, namely the presence of a Longitudinal Slit (S') in an Elongated Support (ES) of a Chain Saw (CS) System, (see FIGS. 8*a*–10*b*), and then follow up by presenting the Disclosure from co-pending patent application Ser. No. 09/853,942. The latter provides context for understanding where in a Chain Saw (CS) such as the Elongated Support (ES) referred to in FIGS. 8*a*–10*b* is located. This approach is used to make clear that the present invention Longitudinal Slit (S') based chain saw chain tensioning and braking invention is complimentary to the previously disclosed Lateral Slit(S) based chain saw chain braking invention.

Turning first then to FIGS. 8*a*–10*b* it is to be appreciated that they show the presence of a Longitudinal Slit (S') in an Elongated Support (ES) of a Chain Saw (CS). The purpose of said Longitudinal Slit (S') is to allow tensioning of a Chain Saw Chain which is slideably present in a Continuous Chain Channel Guide (CG) in the outer perimeter surface of said Elongated Support (ES) by the effecting of separation between Upper (UP) and Lower (LP) portions of said elongated support (ES), thereby the causing of a "stretching" of the Chain Saw Blade, such that when said stretching is appropriate, the chain saw chain is properly tensioned to facilitate motion of said Chain Saw blade.

Figures 8A, 8B, 8C, 8D, 8E:
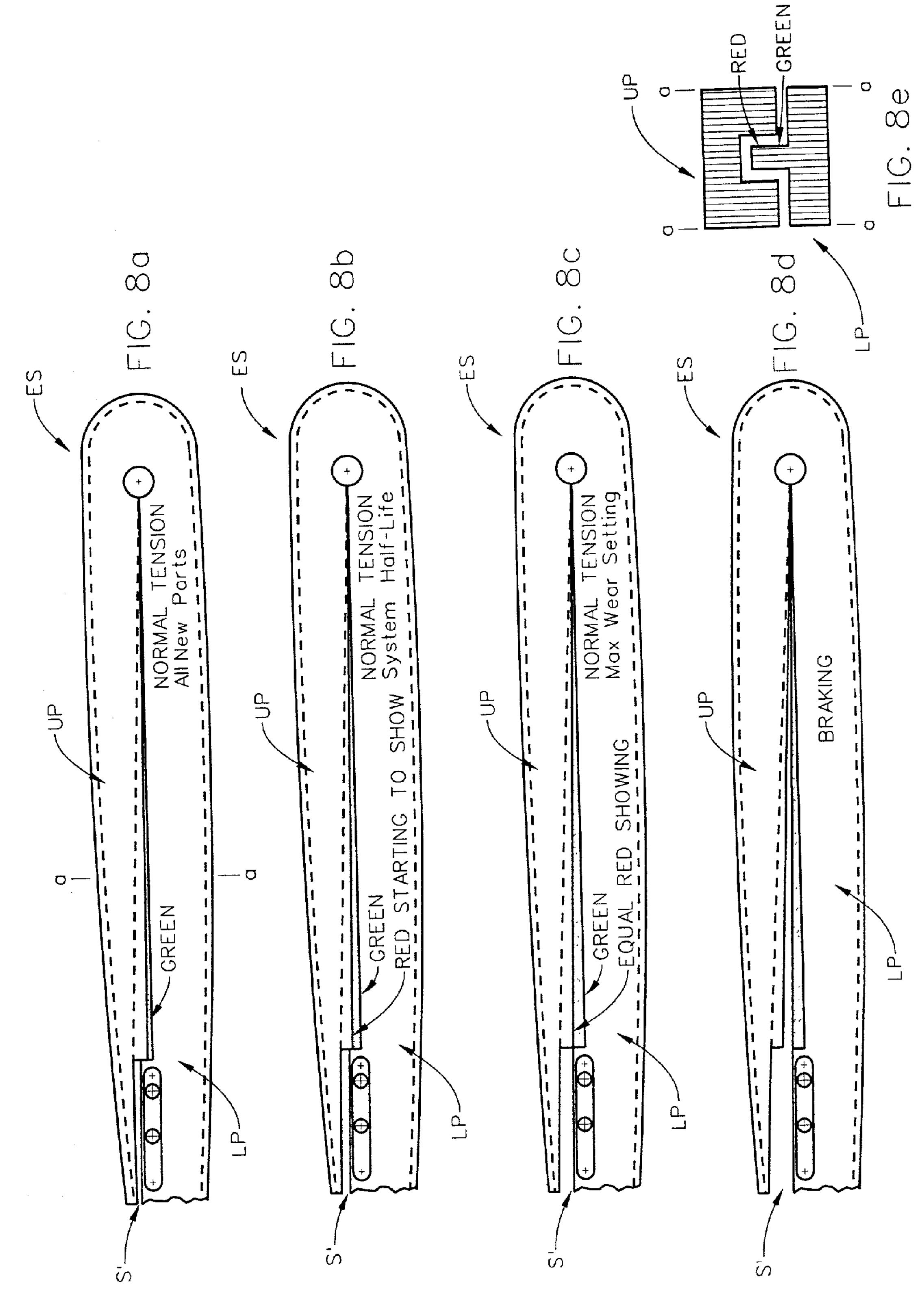
FIGS. 8*a*–8*d* shows a longitudinally oriented slit (S') in an elongated member of a chain saw, for various Longitudinal Slit widths, from that to effect normal tension in a new system, to that which would effect braking of a chain saw chain motion.
FIG. 8*e* shows an expanded scale, partial side cross-sectional view taken at "a—a" in FIG. 8*a*, showing groupings of laminations with the central group of laminations projecting between the outer two groupings.

FIGS. 8*a*–8*d* shows a longitudinally oriented Slit (S') in an Elongated Support (ES) of a chain saw, for various Longitudinal Slit (S') widths, from that to effect normal chain saw chain tension in a new system, (see FIG. 8*a*), to that which would effect braking of a chain saw chain motion (see FIG. 8*d*). Note that the Elongated Support (ES) can comprise a single element but as a non-limiting example is demonstrated to be comprised of laminations. FIGS. 8*a*–8*d* also indicate three laminations wherein a middle lamination is be sandwiched between two outer laminations, and that said middle lamination can be of two colors, Green and Red with the Red being positioned above the Green as viewed in said FIGS. 8*a*–8*d*. FIG. 8*a* has only the Green visible, which indicates normal tensioning in a new system requires very little Longitudinal Slit (S') width. FIG. 8*b* indicates that the Longitudinal Slit (S') width, to provide functional chains saw chain tensioning, has increased such that some Red is showing, which indicates that the chain saw system is at approximately half-life. FIG. 8*c* shows equal amounts of Red and Green showing when the Longitudinal Slit (S') is of a dimension sufficient to provide functional chain saw chain tensioning. This indicates that chain saw system servicing is required. FIG. 8*d* indicates that the Longitudinal Slit (S') is of a large dimension which is sufficient to cause Braking of a chain saw chain. Note also that FIG. 8*a* can be interpreted to represent a Longitudinal Slit (S') which is in a Normally Closed (NC) configuration and FIG. 8*d* can be interpreted to represent a Longitudinal Slit (S') which is manufactured to be in a Normally Open (NO) configuration in its free state. As indicated in FIGS. 9*a*, 9*b* and 10*a*, 10*b* Internal or External controllers then serve to modify the actual width dimension of the Longitudinal Slit (S') between closed in FIGS. 9*a* and 10*a*, and open in FIGS. 9*b* and 10*b*.

FIG. 8*e* shows an expanded scale partial side cross-sectional view taken at "a—a" in FIG. 8*a*, showing groupings of laminations with the central group of laminations projecting between the outer two groupings. The outer surface of the central grouping of laminations is preferably vertically half green and half red as indicated in FIG. 8*c*.

Figure 9A:
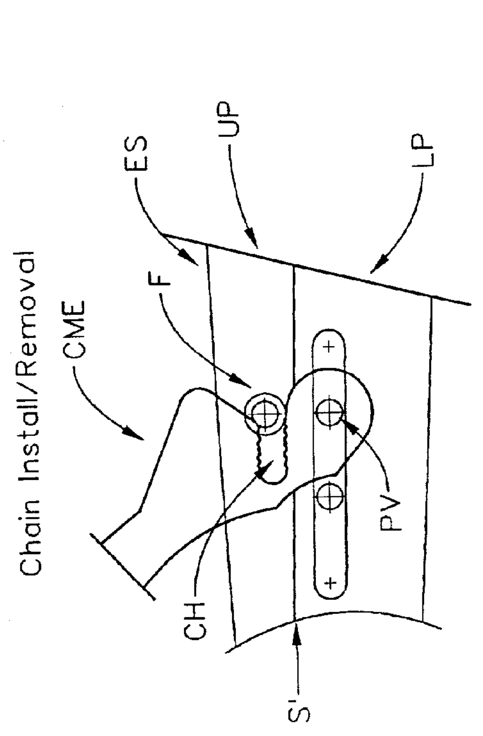
FIGS. 9*a* and 9*b* show a control means (CME) which is external to the Longitudinal Slit (S'), for two setting of Longitudinal Slit (S') width.
Figure 9B:
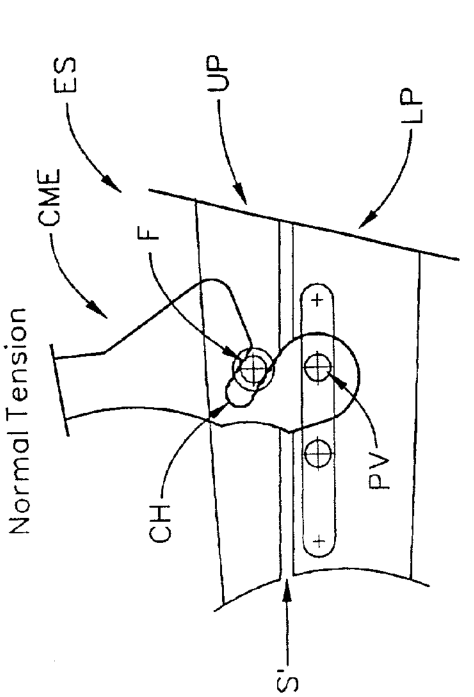

FIGS. 9*a* and 9*b* show an External Control Means (CME) which is functionally affixed "externally" on both sides of the Longitudinal Slit (S') in the Elongated Support (ES), for use in setting of Longitudinal Slit (S') width to adjust chain tensioning and/or chain braking. The two rotational positions of the External Control Means (CME) around Pivot (PV) in the Lower Portion (LP) of the Elongated Support (ES), shown in FIGS. 9*a* and 9*b* respectively, indicate how Longitudinal Slit (S') width is changed by interaction between Fixed Point (F) on Upper Portion (UP) of the Elongated Support (ES), and a Channel (CH) in said External Control Means (CME). Any equivalent "external to the Longitudinal Slit (S')" External Control Means (CME), and (CME) position securing means therefore, is to be considered equivalent and within the scope of the present invention. Note that FIGS. 9*a* and 9*b* demonstrate a Longitudinal Slit (S') which can be Normally Open (NO) or Normally Closed (NC) as manufactured, in its free state.

Figure 10A:
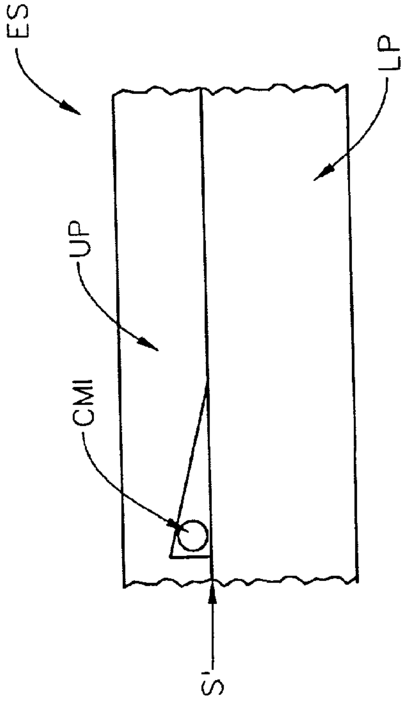
FIGS. 10*a* and 10*b* show a control means (CMI) which is internal to the Longitudinal Slit (S'), for two setting of Longitudinal Slit (S') width.
Figure 10B:
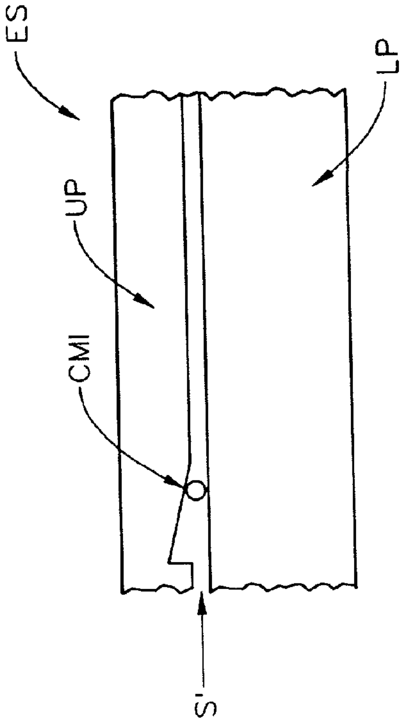

FIGS. 10*a* and 10*b* show an Internal Control Means (CMI) which is "internal" to the Longitudinal Slit (S'), for use in setting of Longitudinal Slit (S') width. It should be appreciated that sliding the Internal Control Means (CMI) between the positions shown in FIGS. 10*a* and 10*b*, has the same effect on Longitudinal Slit (S') width as does rotating the External Control Means (CME) shown in FIGS. 9*a* and 9*b*. Any additional control linkage and securing means to position and secure (CMI), or any functionally equivalent Internal Control Means (CMI) is within the scope of the present invention. Note that FIGS. 10*a* and 10*b* demonstrate a Longitudinal Slit (S') which will be Normally Closed (NC) as manufactured, in its free state.

It is emphasized that FIGS. 9*a*, 9*b*, 10*a* and 10*b* are to be considered demonstrative and not limiting examples of how a Longitudinal Slit (S') width can be controlled.

Figure 7:
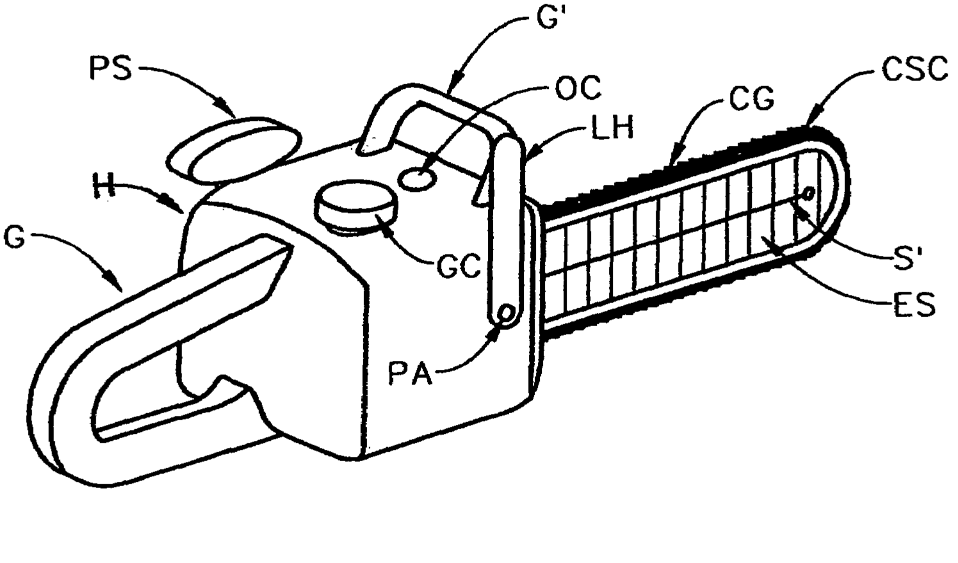
FIG. 7 shows a modified embodiment of the present invention wherein the Lateral Slit (S) and Horizontal Slit (DBG) etc. are present inside the Motor containing Housing (M).
Figure 11:
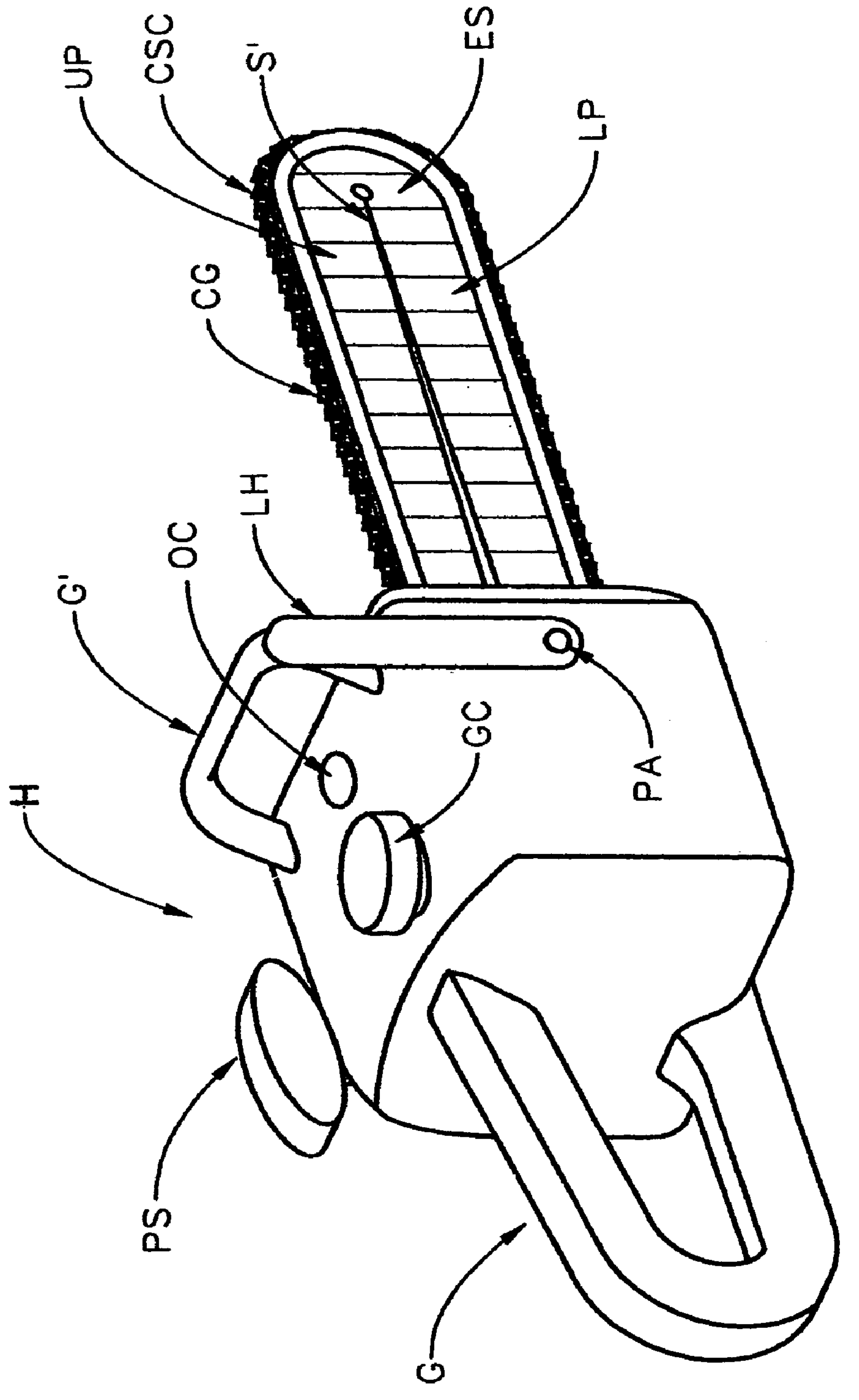
FIG. 11 is FIG. 7 with the Elongated Support (ES) Longitudinal Slit (S') increased to spread the Upper (UP) and Lower (LP) portions to add tension to the chain saw chain (CG).

FIG. 11 is FIG. 7 with the Longitudinal Slit (S') spread open, by the lowering of the Lower Portion (LP) of the Elongated Support (ES) at the point where it exists from the Motor Housing (H). This separates the Upper (UP) and Lower (LP) Portions, thereby adding tension to the chain saw chain (CG). It should be appreciated that it is generally preferable to move the Upper Portion (UP) as in use said Upper Portion (UP) is not loaded. Note that in FIGS. 9*a*–10*b*, Control Means (CME) or (CMI) are to be considered present within the Motor Housing (M), and that other identifiers in FIG. 11 are described with respect to FIG. 7.

Figure 1C:
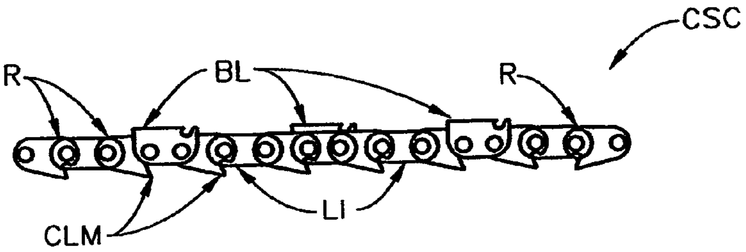
FIG. 1*c* shows an enlarged view of a typical chain saw chain, showing blades or cutters and chain saw sprocket engaging link mating elements (CLM).
Figure 1A:
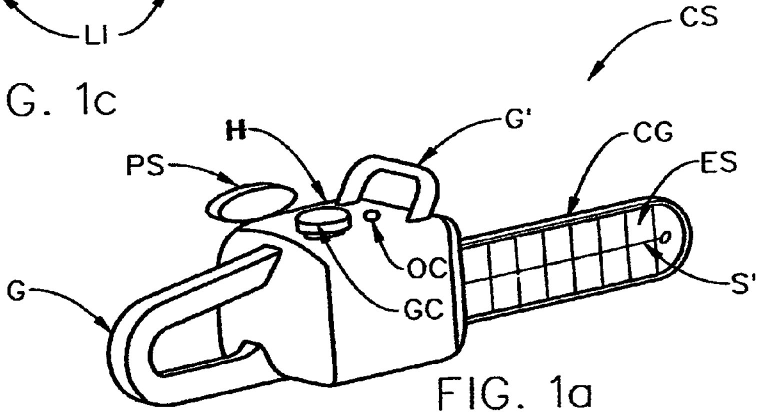
FIG. 1*a* shows a perspective view representation of a typical chain saw (CS) including a Motor in a housing (M), Pull Starter (PS), Gas Cap (GC) and Grips (G) and (G'), Elongated Support (ES) and the Continuous Chain Channel Guide (CG).

In the following discussion, it should throughout be appreciated that, while not discussed, for orientation the location of the present invention Longitudinal Slit (S') is generally shown in FIGS. 1*a*, 1*b*, 2*a*, 6, and 7. Further, it should be understood that, as the topic in co-pending application Ser. No. 09/853,942, the Longitudinal Slit (S') need not be present in conjunction with the Lateral Slit (S) shown in said FIGS. 1*a*, 1*b*, 2*a*, 6, and 7. Continuing, FIG. 1*a* shows a perspective view representation of a chain saw that is similar to a typical conventional Chain Saw (CS) including a Motor contained in a housing (H), Pull Starter (PS), Gas Cap (GC), Oil Cap (OC) and Grips (G) and (G'). The aspect in FIG. 1*a* which distinguishes the present invention over prior art is the Longitudinal Slit (S') in the Elongated Support (ES) which comprises the Continuous Chain Channel Guide (CG) in the outer perimeter surface thereof. For general interest, FIG. 1*c* shows an enlarged view of a Chain Saw Chain showing Links (LI) with Blades or Cutters (BL) affixed thereto, and further showing the presence of Chain Link Mating Elements (CLM) which in use slideably insert into the Continuous Chain Channel Guide (CG). It is to be understood that adjacent Links (LI) in the Chain Saw Chain are interconnected as by means such as Rivets (R), and that said interconnection means allow for limited lateral motion between adjacent links.

Figure 1B:
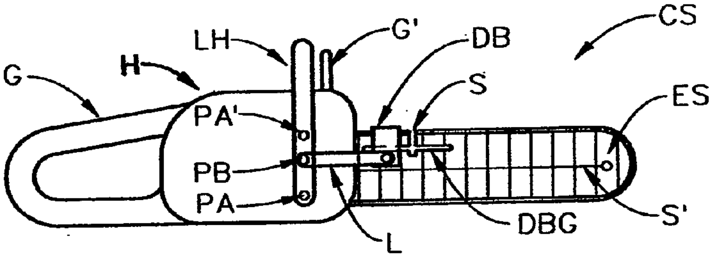
FIG. 1*b* shows the chain saw of FIG. 1 modified to include elements Lateral Slit (S) and Dumbbell Guide (DBG) which comprise the present invention.
Figure 2A:
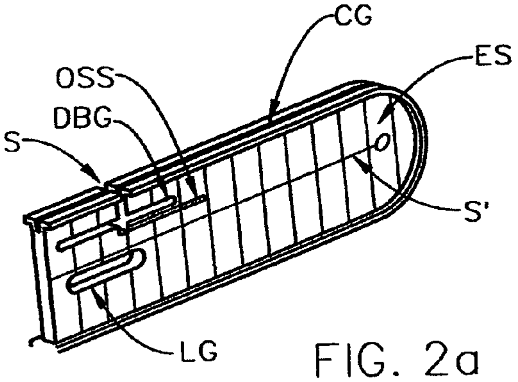
FIG. 2*a* shows a perspective partial view of the Elongated Support (ES) and Continuous Chain Channel Guide (CG) in FIG. 1*b* near where it enters the Motor containing housing (M).
Figure 2B:
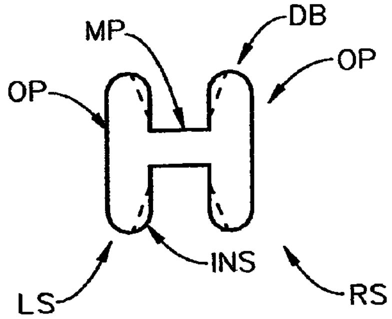
FIG. 2*b* shows a Dumbbell Shaped Element (DB) which is a preferred Continuous Chain Channel Guide Alignment Means.
Figure 3:
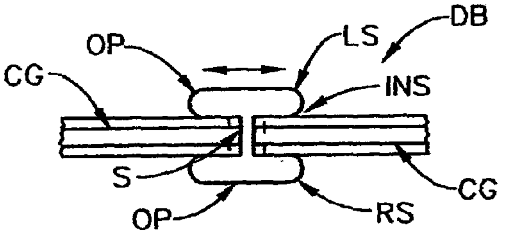
FIG. 3 provides an enlarged view showing application of a Dumbbell Shaped Element (DB) positioned to effect alignment of a Continuous Chain Channel Guide.
Figure 4:
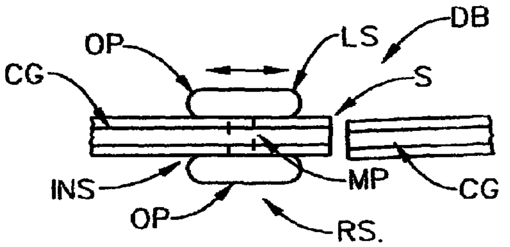
FIG. 4 shows an enlarged view showing Dumbbell Shaped Element (DB) positioned to allow non-alignment of a Continuous Chain Channel Guide.

FIG. 2*a* shows a perspective partial view of the Elongated Support (ES) and Continuous Chain Channel Guide (CG) in FIG. 1*a* near where it enters the Motor containing housing (H). Note the presence of a Lateral Slit (S) which is not present in conventional Chain Saw Elongated Support (ES), as well as a Dumbbell Guide (DBG), the purposes of which will be described with respect to FIGS. 1*b* and 6. Before turning to FIGS. 1*b* and 6, however, attention is directed to FIGS. 3 and 4 which show a Top view looking down from above at the Continuous Chain Channel Guide (CG) in FIG. 1*a*, and also indicating the Lateral Slit (S) in FIG. 2*a*, and a preferred Continuous Chain Channel Guide Alignment Means, Dumbbell Shaped Element (DB), said Dumbbell Shaped Element (DB) being generally demonstrated in FIG. 2*b* as comprising Middle (MP), Outer (OP) and Inner Surface (INS) portions, which Inner Surface (INS) can be, at its outer extents, of a more tapered shape as indicated by the dashed lines such that when said more tapered Inner Surface (INS) regions engage the Channel Guide (CG) on both sides of a Lateral Slit (S), energy stored in the Channel Guide (CG) aides with forcing the Dumbbell (DB) away from said Lateral Slit (S). Note also that a Dumbbell Element could be single sided operating internally, (half-a-Dumbbell shaped), where appropriate securing means are present. (Note that a half-Dumbbell mounted internally would be practical as there would be no protrusion into the saw kerf). That is, it is not necessary for a Dumbbell Element (DB), or functionally equivalent element, to be of a shape so as to cradle the Continuous Chain Channel Guide (CG) on two sides in the vicinity of a Lateral Slit (S), to be within the scope of the present invention. This is easily understood as involving a Continuous Chain Channel Guide Alignment Means where only a left (LS) or right (RS) side of the Dumbbell Element (DB) in FIG. 2*b*, but not both, are present. Note in FIG. 4 that the Continuous Chain Channel Guide (CG) is shown to be offset, one side of the Lateral Slit (S) to the other. However, FIG. 3 shows that sliding the Dumbbell Shaped Element (DB) to the right, causes it to effect alignment of the Continuous Chain Channel Guide (CG) on both sides of the Lateral Slit (S). Note that the Middle Portion (MP) of the Dumbbell Shaped Element (DB) is shown in FIGS. 3 and 4 as dashed lines. Also note where the Inner Surface (INS) of the Dumbbell Shaped Element contacts the Channel Guide (CG) and, as alluded to, realize that a more tapered shape can be utilized to aid with smoothly aligning the two sides of the Channel Guide (CG) on either side of the Lateral Slit (S), as shown in FIG. 4. (Note that the side displacement is limited by (CG) to (CLM) clearances and rivet (R) to (CLM) clearances. Dumbbell (DB) Taper permits easy reset since the displacement is relatively small. The spring force from the Horizontal Slit (DBG) and optionally horizontal slit (OSS) provides the driving force as the bar is biased to return to its free state). Further, it is within the scope of the present invention to provide only a Continuous Chain Channel Guide Alignment Means which comprises only one side, (eg. only the (RS) or (LS)), and still be functional.

It is noted at this point that a present invention will typically provide a Continuous Chain Channel Guide (CG) manufactured to be as shown in FIG. 4, when a Chain Saw (CS) is not being used. That is, the present invention provides that the Continuous Chain Channel Guide (CG), one side of the Lateral Slit (S) to the other, will be manufactured to be fixed in a relative offset position such that a Chain Link Mating element (CLM) mounted in the Continuous Chain Channel Guide (CG) will be impeded from sliding past said Lateral Slit (S) until a user causes the Continuous Chain Channel Guide (CG), one side of the Lateral Slit to the other, to become aligned as shown in FIG. 3. (Note that a horizontal slit (OSS) as shown in FIG. 2*a* might be required). Said offset Continuous Chain Channel Guide (CG) "impedance" comprises a Braking Force and is the underlying principle of operation of the present invention. The offset of the Continuous Chain Channel Guide (CG), one side of the Lateral Slit (S) to the other, it will be easily appreciated then, serves to impede Chain Link Mating Elements (CLM) in links in a Chain Saw Chain, which otherwise slide in said Continuous Chain Channel Guide (CG), from easily sliding across said Lateral Slit (S), until a user causes alignment, as shown in FIG. 3. As indicated, a preferred Alignment means is a Dumbbell Shaped Element (DB), as shown in FIG. 2*b*. In use the Middle Portion (MP) of said Dumbbell (DB) is slideably positioned in Dumbbell Guide (DBG) of FIG. 2*a*, and the Dumbbell Element (DB) Outer Portions (OP) extend so as to encompass the upper Continuous Chain Channel Guide (CG) containing portion of the Elongated Support (ES), as better shown in FIGS. 1*b* and 6. (Note that in FIG. 2*a* an Optional Slit (OSS) is indicated which can be present if the Dumbbell Guide (DBG) "slit" does not allow sufficient compliance to enable Channel Guide offset as demonstrated in FIGS. 3 and 4).

Figure 6:
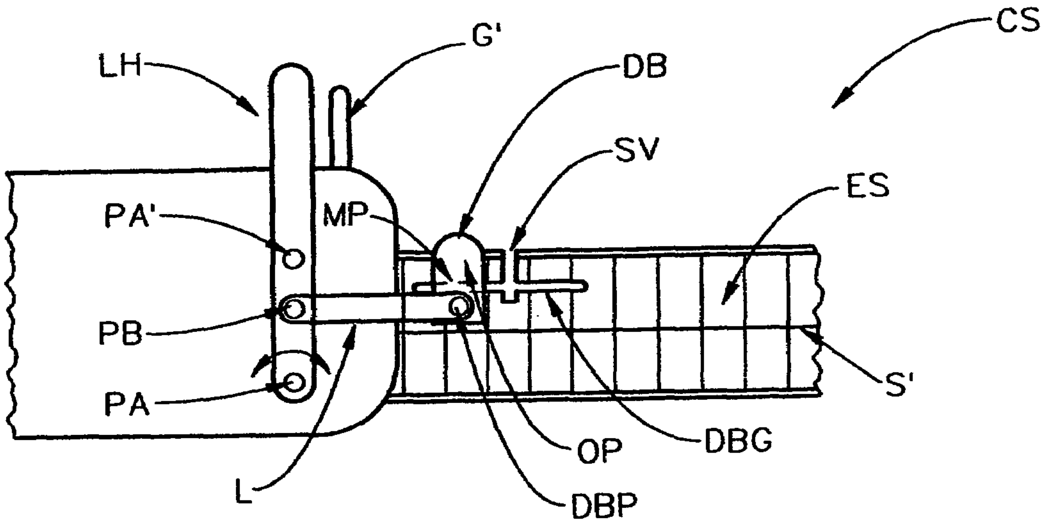
FIG. 6 provides an enlarged view of the present invention elements as identified in FIG. 2.

Continuing, FIG. 1*b* shows a side elevation view of a Chain Saw (CS), much as shown in FIG. 1*a* but with functionally demonstrative present invention system Lateral Slit (S), Dumbbell (DB), Linkage (L), and Leverage Handle (LH) added thereto. FIG. 6 provides an expanded view shoving how the Leverage Handle (LH) can be pivotally mounted to the Chain Saw (CS) Motor (H) housing via Pivot (PA), (or (PA') depending on which direction the Leverage Handle (LH) is to move during operation of the braking effect), and that Pivot (PB) provides interconnection to Linkage (L) which in-turn is pivotally attached to Dumbbell Pivot (DBP), (which can be a loosely affixed connector as opposed to a firm pivot connector system), and Dumbbell Shaped Element (DB). Note that the Middle Portion (MP) of Dumbbell Pivot (DBP) is located on Dumbbell Shaped Element (DB) which is mounted in the Dumbbell Guide (DBG). The preceding discussion of FIGS. 3 and 4 provide insight that movement of the FIG. 6 Leverage Handle (LH) will cause it to pivot about Pivot (PA), and that will cause the Dumbbell Shape Element (DB) movement indicated in FIGS. 3 and 4. Note that the guide identified as (LG) is shown for completeness and is present on all chain saws. It is used in bar adjusting and tension adjusting. Note also that while FIG. 1*b* shows preferred relative orientation of the Leverage Handle (LH) and the Dumbbell Guide (DBG), any functional relative orientation therebetween can be utilized.

Figure 5A:
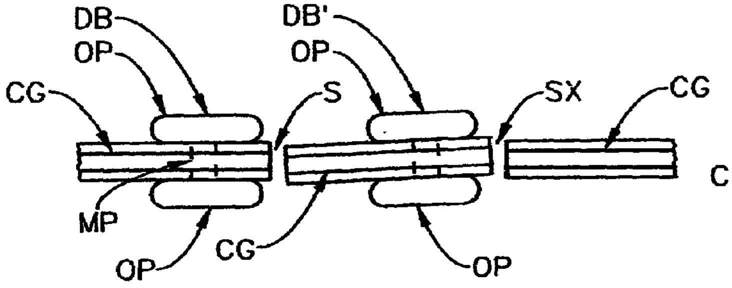
FIG. 5*a* shows an enlarged view of a scenario similar to that in FIG. 4, but for a double Lateral Slit (S) and (Sx) arrangement.
Figure 5G:
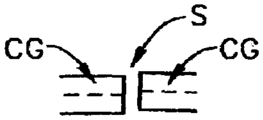
FIG. 5*g* shows a side view of a variation of a lateral slit arrangement wherein the two sides of the Continuous Chain Channel Guide (CG) are caused to change vertically with respect to one another.
Figure 5B:
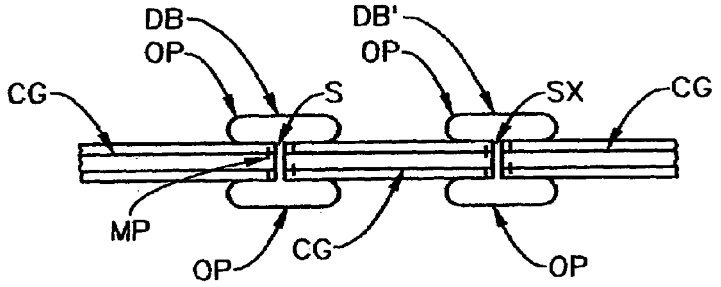
FIG. 5*b* shows an enlarged view of a scenario similar to that in FIG. 3, but for a double Lateral Slit (S) arrangement.

FIGS. 5*a* and 5*b* show another variation of the Lateral Slit (S) aspects of the present invention wherein two Lateral slits (S) and (Sx) are present in the Elongated Support (ES) in the region of the upper Continuous Chain Channel Guide (CG), and two Dumbbell Shaped Elements (DB) and (DB') are present. It is to be understood that additional linkage, (not shown, but can be internal so as not to interfere with the kerf or it could be out of the kerf inside the motor housing), which can be similar to that shown for the single Dumbbell Shaped Element (DB) case in FIGS. 1*b* and 6, will be required to cause the second Dumbbell Shaped Element (DB') to move as indicated in FIGS. 5*a* and 5*b*. As well, it is noted that a single Dumbbell Shaped Element (DB), or functional equivalent, can suffice even in the presently disclosed embodiment, as aligning the Channel Guide (CG) on both sides of one Lateral Slit (S) will tend to align it on both sides of the second Lateral Slit (Sx). FIG. 5*g* shows a side view of a variation of a lateral slit arrangement wherein the two sides of the Continuous Chain Channel Guide (CG) are caused to be offset vertically with respect to one another. This can be effected as a permanent configuration, and thereby serve to smooth out an abrupt Continuous Channel Guide (CG) variation, (as seen by a Chain Saw Chain (CSC). Additionally, where the vertical offset is adjustable, it can also serve to impede Chain Saw Chain (CSC) motion by contact between Chain Saw Chain (CSC) and the Lateral Slit (S) edge. Any linkage for effecting the vertical motion is within the scope of the present invention, but can include a system similar to that shown in FIGS. 10*a* and 10*b* for application to a Longitudinal Slit (S'), where said similar system would be oriented instead near the lateral Slit (S).

Figure 5C:
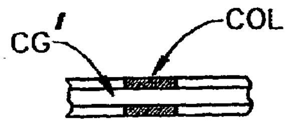
FIGS. 5*c* and 5*d* demonstrate a Continuous Chain Channel Guide (CG') which contains a collapsible region (COL) situated in non-collapsed and collapsed configurations respectively.
Figure 5D:

As additional insight, FIGS. 5*c* and 5*d* demonstrate a Continuous Chain Channel Guide (CG') which contains a Collapsible region (COL) situated in non-collapsed and collapsed configurations respectively. Said Collapsible region (COL) can be comprised of laminations which various activating means can cause to move and thereby collapse the Continuous Chain Channel Guide (CG'), but which laminations retain memory and so return to their "un-collapsed" shape when collapsing force is removed. Said alternative "means which allows effecting an impeded chain channel guide from one side thereof to the other", is to be considered within the scope of the claimed invention as functionally essentially equivalent to the Lateral Silt (S) as in use it serves to stop a chain saw chain from sliding therein. It is noted that only one side of the Continuous Chain Channel Guide (CG') as shown in FIGS. 5*c* and 5*d* might be made collapsible and remain in the scope of the present invention, or that the Collapsible region (COL) can simply comprise a movable portion of the wall on one side of the Continuous Chain Channel Guide (CG'). Any functional linkage can be applied to effect the action demonstrated in FIGS. 5*c* and 5*d*.

Figure 5E:
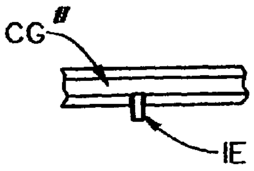
FIGS. 5*e* and 5*f* shows alternative means for impeding a chain saw chain slideability in a Continuous Chain Channel Guide (CG"), comprising an insertion element (IE).
Figure 5F:
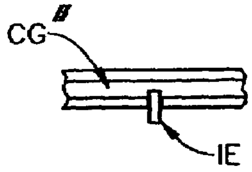

FIGS. 5*e* and 5*f* show yet another alternative means for impeding a chain saw chain slideability in a Continuous Chain Channel Guide (CG"), comprising an Insertion Element (IE) which can be entered and removed to the Continuous Chain Channel Guide (CG") via a means for entering said insertional element, (eg. a hole in the wall of the Continuous Chain Channel Guide (CG")), by any functional linkage. Note that the Insertion Element (IE) can simply comprise a small part of the wall of the Continuous Chain Channel Guide (CG"), which wall is laterally movable.

FIGS. 1–6 serve to show how the Lateral Slit (S) braking function of the present invention functions with relevant examples. However, it can be appreciated that if the means for impeding a chain saw chain slideability in a Continuous Chain Channel Guide (CG), (eg. Lateral Slit (S) and associated Dumbbell Guide (DBG), Dumbbell Shaped Element (DB) and Linkage (L)), are positioned within the Motor Housing (H), they would be less susceptible to damage. Further it is emphasized that any functional linkage between the Leverage Handle (LH), or a functional equivalent thereto, can be substituted in FIGS. 1*b*, 6 and 7 and the result will remain within the scope of the present invention. For instance, the Leverage Handle (LH) could be mounted to a Chain Saw Power Head, Cutter bar, etc. That is, in FIGS. 1–6 it is primarily the Lateral Slit (S) functional chain saw chain motion impedance effecting means, present in the Elongated Support (ES), (typically in the region of the upper Continuous Chain Channel Guide (CG)), and functional utility provided thereby, which comprises the novelty.

It is noted that the Lateral Slit (S) in FIGS. 1–6 can be fashioned to have edges which are radiused to reduce an abrupt chain link collision effect. A gradual shape can also serve to place additional links into contact with an offset Continuous Chain Channel Guide (CG) during braking.

FIG. 7 shows a modified embodiment of the present invention implying, by the presence of the Leverage Handle (LH), that all the other elements, (eg. (S), (DBG) and (DB)), are present inside the protective motor containing Housing (H).

The present invention then is primarily found in the Chain Saw Chain (CG) tension and braking utility enabled by the presence of a Longitudinal Slit (S') in the Elongated Support (ES) of a chain saw (CS). The present invention is enhanced by braking utility enabled by the presence of a Lateral Slit (S) in the Elongated Support (ES).

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A chain saw comprising a housing, a chain comprised of links which include chain link mating elements and cutters, and an elongated support extending in a longitudinal direction outward from inside said housing, in the outer surface of said elongated support there being present a continuous chain channel guide into which said chain link mating elements are slideably inserted, such that during normal operation said chain link mating elements slide essentially freely through said continuous chain channel guide when forced to do so, said elongated support being slit in said longitudinal direction, such that upper and lower portions above and below the longitudinal slit can be separated from one another at least at one location along the longitudinal extent thereof, said longitudinal slit enabling separation of the upper and lower portions of said elongated support, and thereby causing tensioning of said chain;

said chain saw further comprising control means for applying force between said upper and lower portions of the elongated support to move said upper and lower portions with respect to one another; and said longtitudinal slit further comprising, an effective projection on one of said upper and lower portions of the elongated support and an effective groove present in the other, said effective projection and effective groove being functionally oriented with respect to one another such that said effective projection inserts into said effective groove at locations along said longitudinal slit whereat said upper and lower portions of the elongated support contact one another, said effective projection being of a first color proximally and of a second color peripherally.

2. A chain saw as in claim 1, in which the control means for applying force between said upper and lower portions of the elongated support comprises a fixed element on one of said upper and lower portions of said elongated support and a rotatable element rotatably affixed to the other of said upper and lower portions, said fixed and rotatable elements being functionally positioned with respect to one another such that interaction between said fixed and rotatable elements caused by rotating said rotatable element causes said upper and lower portions of the elongated support change position with respect to one another at least at one location across said longitudinal slit.

3. A chain saw as in claim 1, in which the control means for applying force between said upper and lower portions of the elongated support comprises a moveable element placed between said upper and lower portions of the elongated support, said moveable element being functionally positioned with respect to said upper and lower portions such that motion thereof causes said upper and lower portions of the elongated support to change position with respect to one another at least at one location across said longitudinal slit.

4. A chain saw comprising a housing and an elongated support extending in a longitudinal direction outward from inside said housing, said elongated support having a longitudinally oriented slit therein, said longitudinal slit enabling upper and lower portions above and below said longitudinal slit to be separated from one another at least at one location along the longitudinal extent thereof;

said chain saw further comprising means for applying force between said upper and lower portions of the elongated support to move said upper and lower portions with respect to one another; and said longtitudinal slit further comprising an effective projection on one of said upper and lower portions of the elongated support and an effective groove present in the other, said effective projection and effective groove being functionally oriented with respect to one another such that said effective projection inserts into said effective groove at locations along said longitudinal slit whereat said upper and lower portions of the elongated support contact one another, said effective projection being of a first color proximally and of a second color peripherally.

5. A chain saw as in claim 4, in which the control means for applying force between said upper and lower portions of the elongated support comprises a fixed element on one of said upper and lower portions of said elongated support and a rotatable element rotatably affixed to the other of said upper and lower portions, said fixed and rotatable elements being functionally positioned with respect to one another such that interaction between said fixed and rotatable elements caused by rotating said rotatable element causes said upper and lower portions of the elongated support change position with respect to one another at least at one location across said longitudinal slit.

6. A chain saw as in claim 4, in which the control means for applying force between said upper and lower portions of the elongated support comprises a moveable element placed between said upper and lower portions of the elongated support, said moveable element being functionally positioned with respect to said upper and lower portions such that motion thereof causes said upper and lower portions of the elongated support to change position with respect to one another at least at one location across said longitudinal slit.

7. A chain saw comprising a housing, a chain comprised of links which include chain link mating elements and cutters, and an elongated support extending in a longitudinal direction outward from inside said housing, in the outer surface of said elongated support there being present a continuous chain channel guide into which said chain link mating elements are slideably inserted, such that during normal operation said chain link mating elements slide essentially freely through said continuous chain channel guide when forced to do so, said continuous chain channel guide having a lateral slit present therein which allows effecting an offset of said continuous chain channel guide thereacross said offset serving to impede the slideability of said chain link mating elements across said lateral slit;

said elongated support being slit in said longitudinal direction such that upper and lower portions above and below the longitudinal slit can be separated from one another, said longitudinal slit enabling separation of the upper and lower portions of said elongated support at least at one location along the longitudinal extent thereof, and thereby causing tensioning of said chain;

said chain saw further comprising control means for applying force between said upper and lower portions of the elongated support to move said upper and lower portions with respect to one another; and said longtitudinal slit further comprising an effective projection on one of said upper and lower portions of the elongated support and an effective groove present in the other, said effective projection and effective groove being functionally oriented with respect to one another such that said effective projection inserts into said effective groove at locations along said longitudinal slit whereat said upper and lower portions of the elongated support contact one another, said effective projection being of a first color proximally and of a second color peripherally.

8. A chain saw as in claim 7, in which said continuous chain channel guide is in an offset position from one side of said lateral slit to the other.

9. A chain saw as in claim 7, which further comprises a second lateral slit in said continuous chain channel guide which allows effecting an offset of said continuous chain channel guide thereacross.

10. A chain saw as in claim 9, in which said continuous chain channel guide is in an offset position across said second lateral slit.

11. A chain saw as in claim 7, in which the control means for applying force between said upper and lower portions of the elongated support comprises a fixed element on one of said upper and lower portions of said elongated support and a rotatable element rotatably affixed to the other of said upper and lower portions, said fixed and rotatable elements being functionally positioned with respect to one another such that interaction between said fixed and rotatable elements caused by rotating said rotatable element causes said upper and lower portions of the elongated support change position with respect to one another at least at one location across said longitudinal slit.

12. A chain saw as in claim 7, in which the control means for applying force between said upper and lower portions of the elongated support comprises a moveable element placed between said upper and lower portions of the elongated support, said moveable element being functionally positioned with respect to said upper and lower portions such that motion thereof causes said upper and lower portions of the elongated support to change position with respect to one another at least at one location across said longitudinal slit.

13. A chain saw comprising a housing, a chain comprised of links which include chain link mating elements and cutters, and an elongated support extending in a longitudinal direction outward from inside said housing, in the outer surface of said elongated support there being present a continuous chain channel guide into which said chain link mating elements are slidably inserted, such that during normal operation said chain link mating elements slide essentially freely through said continuous chain channel guide when forced to do so, said continuous chain channel guide having means for impeding the slideability of said chain saw chain in said continuous chain channel guide;

said elongated support being slit in said longitudinal direction, such that upper and lower portions above and below the longitudinal slit can be separated from one another, said longitudinal slit enabling separation of the upper and lower portions of said elongated support at least at one location along the longitudinal extent thereof, and thereby causing tensioning of said chain;

said chain saw further comprising control means for applying force between said upper and lower portions of the elongated support to move said upper and lower portions with respect to one another; and said longtitudinal slit further comprising an effective projection on one of said upper and lower portions of the elongated support and an effective groove present in the other, said effective projection and effective groove being functionally oriented with respect to one another such that said effective projection inserts into said effective groove at locations along said longitudinal slit whereat said upper and lower portions of the elongated support contact one another, said effective projection being of a first color proximally and of a second color peripherally.

14. A chain saw as in claim 13 which further comprises at least one lateral slit in said elongated support, said at least one lateral slit being oriented substantially perpendicular to said longitudinal slit.

15. A chain saw as in claim 13, in which the control means for applying force between said upper and lower portions of the elongated support comprises a fixed element on one of said upper and lower portions of said elongated support and a rotatable element rotatably affixed to the other of said upper and lower portions, said fixed and rotatable elements being functionally positioned with respect to one another such that interaction between said fixed and rotatable elements caused by rotating said rotatable element causes said upper and lower portions of the elongated support change position with respect to one another at least at one location across said longitudinal slit.

16. A chain saw as in claim 13, in which the control means for applying force between said upper and lower portions of the elongated support comprises a moveable element placed between said upper and lower portions of the elongated support, said moveable element being functionally positioned with respect to said upper and lower portions such that motion thereof causes said upper and lower portions of the elongated support to change position with respect to one another at least at one location across said longitudinal slit.

17. A chain saw comprising a housing, a chain comprised of links which include chain link mating elements and cutters, and an elongated support extending in a longitudinal direction outward from inside said housing, in the outer surface of said elongated support there being present a continuous chain channel guide into which said chain link mating elements are slideably inserted, such that during normal operation said chain link mating elements slide essentially freely through said continuous chain channel guide when forced to do so, said continuous chain channel guide having a lateral slit present therein which can be caused to effect an offset of said continuous chain channel guide thereacross;

said elongated support being slit in said longitudinal direction such that upper and lower portions above and below the longitudinal slit can be separated from one another at least at one location along the longitudinal extent thereof, said longitudinal slit enabling separation of the upper and lower portions of said elongated support, and thereby causing tensioning of said chain;

said chain saw further comprising control means for applying force between said upper and lower portions of the elongated support, said control means being a selection from the group consisting of:

a control means for applying force between said upper and lower portions of the elongated support comprising a fixed element on one of said upper and lower portions of said elongated support and a rotatable element rotatably affixed to the other of said upper and lower portions, said fixed and rotatable elements being functionally positioned with respect to one another such that interaction between said fixed and rotatable elements caused by rotating said rotatable element causes said upper and lower portions of the elongated support change position with respect to one another at least at one location across said longitudinal slit; and a control means for applying force between said upper and lower portions of the elongated support comprising a moveable element placed between said upper and lower portions of the elongated support, said moveable element being functionally positioned with respect to said upper and lower portions such that motion thereof causes said upper and lower portions of the elongated support to change position with respect to one another at least at one location across said longitudinal slit;

said longtitudinal slit comprising an effective projection on one of said upper and lower portions of the elongated support and an effective groove present in the other, said effective projection and effective groove being functionally oriented with respect to one another such that said effective projection inserts into said effective groove at locations along said longitudinal slit whereat said upper and lower portions of the elongated support contact one another, said effective projection being of a first color proximally and of a second color peripherally.

18. A chain saw as in claim 17, which further comprises a second lateral slit in said continuous chain channel guide which can be caused to effect an offset of said continuous chain channel guide thereacross.

19. A chain saw as in claim 17, which comprises means for controlling offset across said lateral slit.

20. A chain saw as in claim 17, in which the first effective projection first color is green and the second color is red.

* * * * *